(12) United States Patent
Fukuda

(10) Patent No.: US 6,398,683 B1
(45) Date of Patent: Jun. 4, 2002

(54) TRANSMISSION COVER AND SUPPORTING ARRANGEMENT FOR ALL TERRAIN VEHICLE

(75) Inventor: Kazutaka Fukuda, Shizuoka-ken (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/299,889

(22) Filed: Apr. 27, 1999

(30) Foreign Application Priority Data

Apr. 27, 1998 (JP) .......................................... 10-116786
Jul. 3, 1998 (JP) .......................................... 10-188894

(51) Int. Cl.[7] .............................. B62J 13/00; F16H 7/00; B62M 13/00
(52) U.S. Cl. ...................... 474/144; 180/219; 180/230; 474/146
(58) Field of Search .............................. 474/16, 17, 14, 474/15, 44–48, 144; 123/198; 74/606 R, 606 A; 180/219, 227, 230, 228

(56) References Cited

U.S. PATENT DOCUMENTS

| 3,885,650 A | * | 5/1975 | Klaue ..................... 188/71.4 X |
| 4,606,310 A | | 8/1986 | Makino |
| 4,723,619 A | * | 2/1988 | Yamamoto et al. ..... 474/144 X |
| 4,736,809 A | | 4/1988 | Kumazawa |
| 5,006,092 A | * | 4/1991 | Neuman et al. ................ 474/8 |
| 5,085,186 A | | 2/1992 | Kobayashi |
| 5,334,108 A | * | 8/1994 | Lamers .......................... 474/8 |
| 6,076,624 A | * | 6/2000 | Izumi et al. ................ 180/291 |
| 6,086,492 A | * | 7/2000 | Nakano et al. ............... 474/16 |
| 6,155,371 A | | 12/2000 | Izumi |
| 6,269,899 B1 | | 8/2001 | Izumi |

FOREIGN PATENT DOCUMENTS

JP               123941     *    5/1999

OTHER PUBLICATIONS

Parts Catalogue, Model Year 1999, YFA1L BREEZE.
Parts Catalogue, Model Year 1999, YFM600FWAL, YFM600FWALC.
Parts Catalogue, Model Year 1998, YFM600FWAK.
Parts Catalogue, Model Year 1998, YFA1K.
Parts Catalogue, Model Year 1997, YFA1J.

* cited by examiner

*Primary Examiner*—Thomas R. Hannon
*Assistant Examiner*—Marcus Charles
(74) *Attorney, Agent, or Firm*—Knobbe, Martens, Olson & Bear, LLP

(57) ABSTRACT

An all terrain vehicle has a crankcase cover and shaft supporting arrangement through which a shaft of a transmission is mounted between the crankcase and a crankcase cover. The arrangement includes a spider bracket having a bearing carrier and a cover member attached to the crankcase through the spider arrangement. The crankcase cover is preferably made of a less thermally conductive material as compared to the spider.

26 Claims, 9 Drawing Sheets

US 6,398,683 B1

TRANSMISSION COVER AND SUPPORTING ARRANGEMENT FOR ALL TERRAIN VEHICLE

BACKGROUND OF THE INVENTION

1. Field of the Invention

The present invention generally relates to a transmission arrangement for all terrain vehicles. More particularly, the present invention relates to a cover and shaft supporting arrangement for such a transmission.

2. Description of the Related Art

All terrain vehicles have begun employing variable speed transmissions. Such variable speed transmissions utilize a drive pulley that may be coupled to a crankshaft of an engine through any suitable mechanism. The drive pulley, in turn, may be connected to a driven pulley through a belting arrangement such that as the belt rotates under the force of the drive pulley, the driven pulley is also rotated.

In some vehicles, the driven pulley may be carried upon an output shaft that extends into a crankcase of the all terrain vehicle. This output shaft is often carried by two sets of bearings carried within the crankcase and arranged along the output shaft such that the output shaft is cantilevered outwards to receive the driven pulley. The drive pulley however may be carried on a driveshaft that is carried on one end by a set of bearings that are supported by the crankcase. In such constructions, the driveshaft is also cantilevered. Accordingly, the wall that supports the bearings must be of increased thickness and heft. Moreover, the driveshaft experiences a high level of bending forces as the driveshaft spins the drive pulley.

SUMMARY OF THE INVENTION

Thus, it is desired to have a crankcase cover and bearing supporting arrangement capable of having a reduced weight while not significantly reducing the strength of such a cover assembly. Moreover, the driveshaft should be supported in a manner in which the driveshaft does not experience the increased bending forces.

Accordingly, one aspect of the present invention is an all terrain vehicle comprising a frame with an engine compartment defined within the frame. An engine is mounted within the engine compartment. The engine comprises a crankcase, a transvsersely-extending crankshaft and a transmission connected to the crankshaft. The transmission comprises a drive pulley, a driven pulley and a flexible loop connecting the drive pulley to the driven pulley. A transmission inputs connected to the drive pulley with a first bearing supporting a first end of the input shaft and positioned proximate the crankcase. A second bearing supports a second end of the input shaft with a bearing bracket carrying the second bearing. A bearing retaining portion is formed on the bearing bracket with the bearing positioned within the bearing retaining portion. The bearing bracket having at least one arm that extends between the crankcase and the bearing retaining portion.

Another aspect of the present invention involves a transmission cover for an all terrain vehicle. The transmission cover comprises a mounting bracket and a cover member. The mounting bracket comprises a bearing support. The bearing support has an aperture with a center axis. The mounting bracket also has at least one arm with a first portion extending radially away from the bearing support in a direction generally normal to the center axis and a distal second portion extending in a direction generally parallel to the center axis. The cover member is preferably sized and configured to encase the mounting bracket.

BRIEF DESCRIPTION OF THE DRAWINGS

These and other features, aspects and advantages of the present invention will now be described with reference to the drawings of certain preferred embodiments, which embodiments are intended to illustrate and not to limit the invention, and in which drawings.

DETAILED DESCRIPTION OF THE PREFERRED EMBODIMENTS OF THE INVENTION

Figure 1:
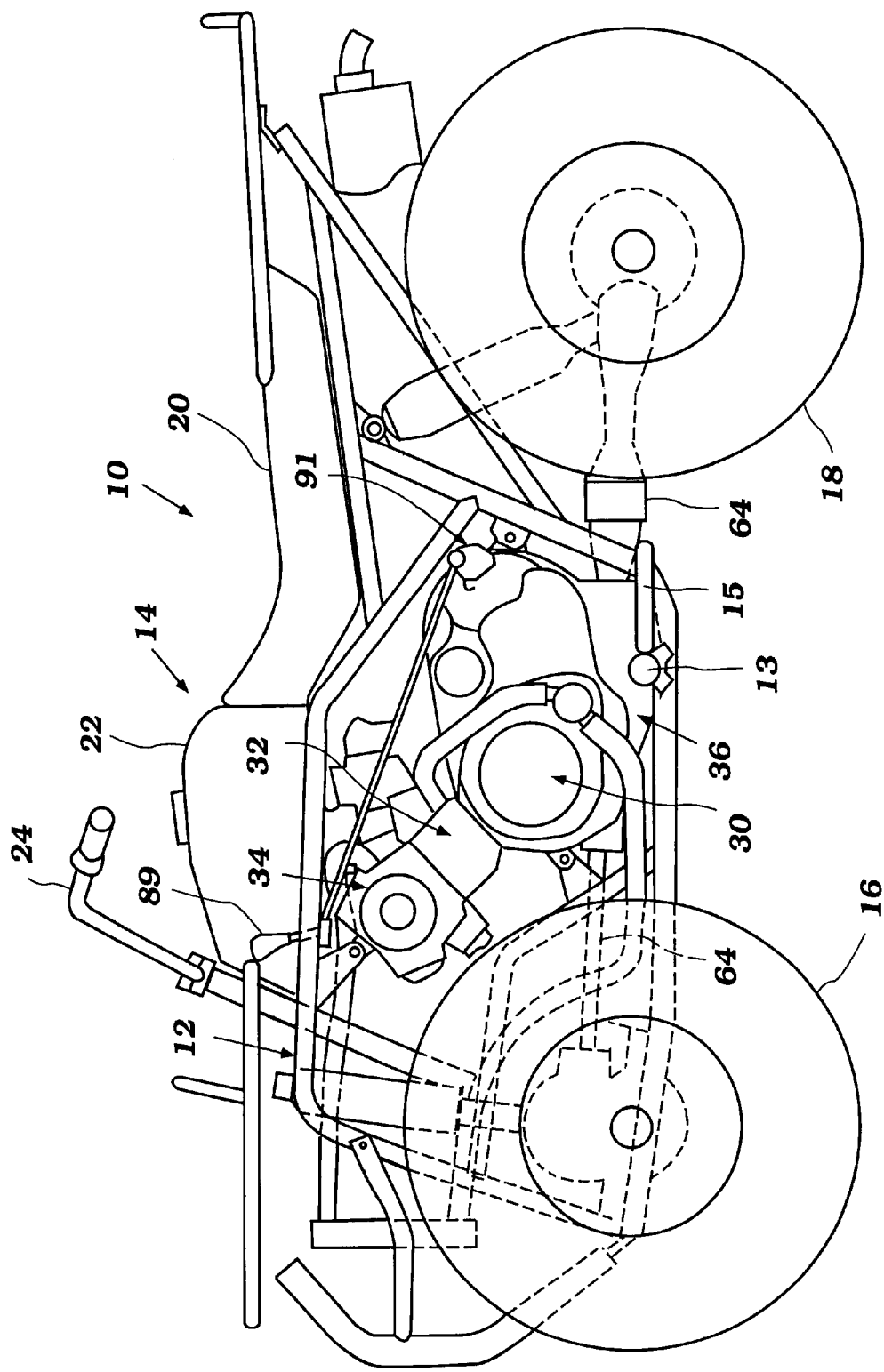
FIG. 1 is a side view of an all terrain vehicle arranged and configured in accordance with certain features, aspects and advantages of the present invention and having some internal components illustrated with hidden lines.

With reference initially to FIG. 1, an all terrain vehicle configured and arranged in accordance with certain features, aspects and advantages of the present invention will be described in detail. The illustrated vehicle, indicated generally by the reference numeral 10, provides an exemplary environment in which the present crankcase cover shaft supporting arrangement will be described. While the illustrated vehicle 10 is a small stature four-wheel all terrain vehicle, one of ordinary skill in the art will readily recognize that the present invention may find utility in a variety of other vehicles as well.

With continued reference to FIG. 1, the vehicle 10 is generally comprised of a frame 12, a body 14, a pair of front wheels 16 and a pair of rear wheels 18 assembled in any suitable manner. The frame 12 is typically of a welded construction and generally defines, in part, a centrally located engine compartment. A foot peg 13 and foot board structure 15 may be attached to the frame in any suitable manner. In the illustrated arrangement, the foot peg 13 and the foot board 15 are arranged to lie substantially below a seat 20 proximate the real wheels 18. Moreover, the foot peg 13 and the foot board 15 are welded to the frame 12.

The illustrated frame also carries several components that form the body 14. For instance, the seat 20 is carried atop a rear portion of the frame 12. A fuel tank 22 is secured to the frame 12 forward of the seat 20. Moreover, a steering handle assembly 24 may be connected to the front wheels 16 in any suitable manner. The steering handle assembly 24 preferably extends upward through the frame 12 to a location generally above a forward portion of the fuel tank 22. As will be recognized, gauges, which may transmit information relating to the operating conditions of the vehicle 10, may be arranged proximate the steering handle assembly 24. As each of these components, and the methods related to manufacturing and assembling such components, are considered to be well known to those of ordinary skill in the art, further description is deemed unnecessary.

An internal combustion engine 30 is mounted to the frame 12 within the engine compartment in any suitable manner. In the illustrated arrangement, the engine 30 comprises a one cylinder four-cycle construction. It should be appreciated that the engine 30 could also have two or more cylinders and could operate on any known operating principal, such as a two-cycle principal, for instance.

Figure 3:
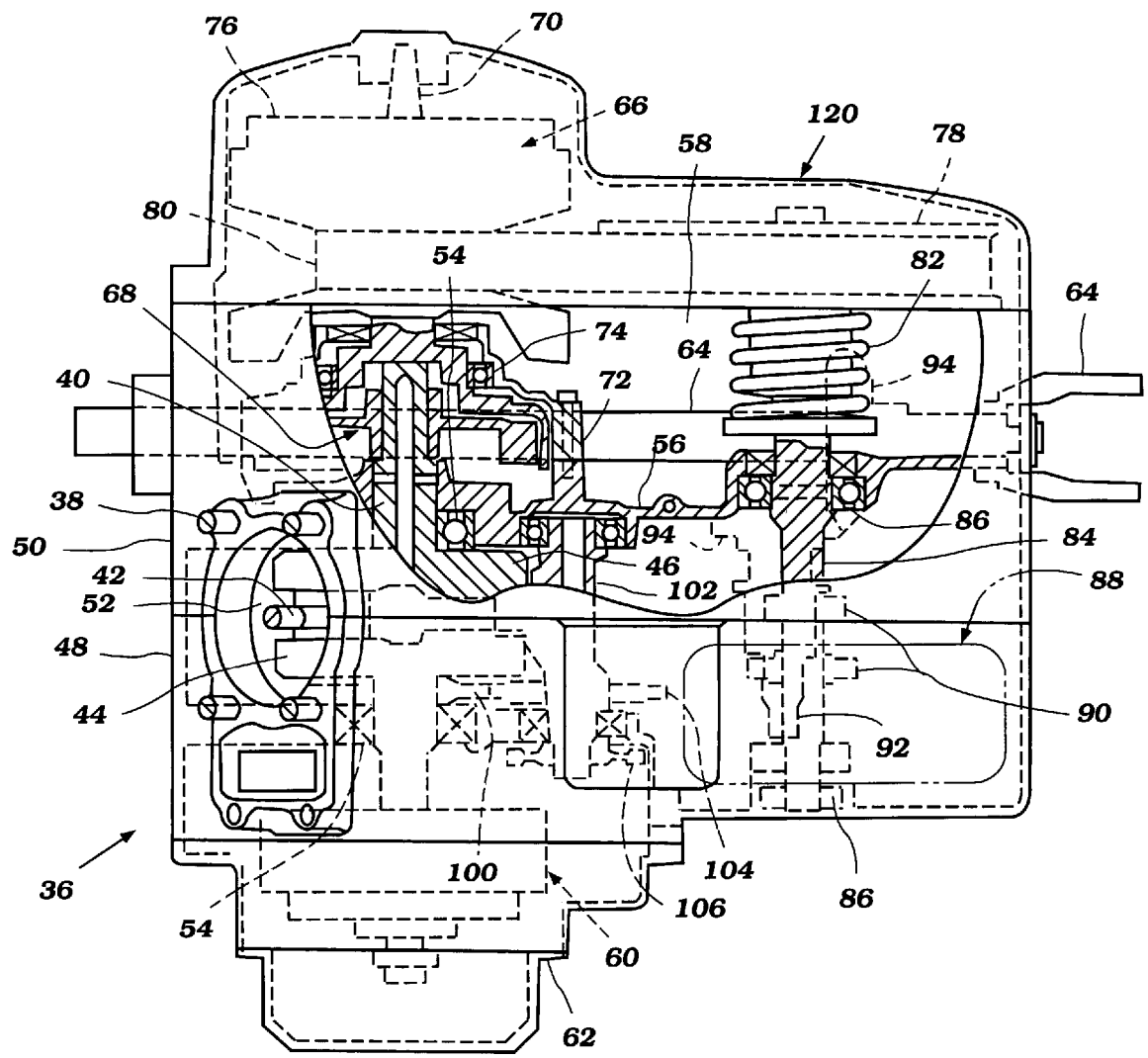
FIG. 3 is a partially sectioned top view of the crankcase of FIG. 2 with some internal components illustrated with hidden lines.

With reference now to FIGS. 1 and 3, the engine 30 generally comprises a cylinder block 32, a cylinder head assembly 34 and a crankcase 36. The cylinder block 32 preferably contains at least one cylinder bore (not shown) which may be inclined along an axis that is skewed relative to a vertically extended axis. Such a configuration allows for a reduced vertical dimension to the overall engine envelope and, therefore, creates a more compact engine arrangement for a reduced vehicle size and weight.

The cylinder head assembly 34 may be attached to the cylinder block 32 and arranged to cover an end of the cylinder bore (not shown). The cylinder head assembly 34 preferably features a recess which cooperates with the cylinder bore and a top surface of a piston (not shown) to define a combustion chamber within the cylinder. The illustrated crankcase 36 is attached to the cylinder block 32 with a set of threaded fasteners 38 (see FIG. 3) but may be attached in any other suitable manner.

With reference to FIG. 3, the piston (not shown) reciprocates within the cylinder bore (not shown) and is connected to a crankshaft 40 via a connecting rod 42. The connecting rod 42 is preferably connected to a throw 44 of the crankshaft 40 such that, as the piston (not shown) completes a full translating cycle, the crankshaft 40 may complete a full revolution. A counterweight portion 46 preferably extends from the opposite side of the crankshaft 40 relative to the throw 44. The linkage between the piston (not shown) and the crankshaft 40 therefore transposes the piston's reciprocal translating motion into a rotational output while the counterweight portion helps to balance the rotation of the crankshaft and reduce engine vibration.

The crankshaft 40, as best illustrated in FIG. 3, is substantially restrained for rotational movement within the crankcase 36. In the illustrated arrangement, the crankcase is split at approximately a substantially longitudinally extending plane that passes through the connecting rod 42. As such, a first portion 48 is connected to a second portion 50 to define, among other chambers, a crank chamber 52. In the illustrated arrangement, a set of bearings 54 journal the crankshaft 40 for rotation within the crank chamber 52. The bearings 54 may be set within a substantially vertically extending wall 56 which, in part, defines a single cell of the crank chamber 52 that corresponds to the single cylinder. As will be recognized, in multiple cylinder arrangements, a plurality of such walls may segregate the crank chamber 52 into several chambers such that one chamber would correspond to one cylinder. Notably, the wall 56 generally divides the illustrated crankcase into the crank chamber 52 and an auxiliary chamber 58.

A flywheel magneto 60 is connected to one end of the illustrated crankshaft 40. As is known, the flywheel magneto 60 rotates with the crankshaft 40 and may be used to sense the engine speed. Additionally, the flywheel magneto 60 may function as an electrical generator in some arrangements. As illustrated in FIG. 3, the flywheel 60 is contained in part within a flywheel cover that is attached to a portion of the crankcase 36 in any suitable manner. As the flywheel magneto 60 is relatively unimportant to the present mounting and cover arrangement, further description of the flywheel magneto 60 is deemed unnecessary.

With continued reference to FIG. 3, the rotational power of the illustrated crankshaft 40 is transferred to at least one drive line 64 through a variable speed belt drive transmission 66. In the illustrated arrangement, the drive line 64 is preferably a pair of drive shafts; however, as will be recognized by those of ordinary skill in the art, the drive line 64 may also comprise chain drives, gear drives or any other suitable drive arrangement. As illustrated in FIG. 3, the drive line 64 preferably extends substantially normally to the crankshaft 40. Accordingly, a transfer gearing arrangement, discussed below, is provided within a gear box formed within the illustrated auxiliary chamber 58 to transfer the power from a laterally extending crankshaft 40 to the longitudinally extending driveline 64.

In the illustrated arrangement, a centrifugal clutch 68 connects the crankshaft 40, which extends through the wall 56, and a transmission input shaft 70. The transmission input shaft 70 serves as a driveshaft for the variable speedbelt transmission 66. The centrifugal clutch 68, as is well known, automatically disengages the input shaft 70 from the crankshaft 40 when the engine speed falls below a predetermined speed and reengages the two shafts 40, 70 when the engine speed exceeds the predetermined speed. The clutch 68 includes a bearing supporting wall 72 that encases at least a portion of the moving components of the clutch 68 and houses a set of bearings 74, which are described below. The walls 72, 56 in the illustrated arrangement form, in part, a clutch chamber which is generally isolated from the crank chamber 45 and the auxiliary chamber 58.

The input shaft 70, as illustrated, extends through the wall 72 and is preferably journaled for rotation by the set of bearings 74 that are carried by the wall 72. Additionally, the input shaft 70 is carried at the other end by a set of bearings that are carried within the crankcase cover arrangement as will be described in detail below. In this manner, the input shaft 70 is not cantilevered from the crankcase, but is journaled for rotation proximate its ends.

A V-belt drive pulley 76 is preferably connected to the input shaft 70 with splines such that the drive pulley 76 is coupled for rotation with the input shaft 70. As is known, the drive pulley 76 is designed to expand or contract due to increases or decreases in the engine speed thereby altering the effective diameter of the drive pulley as the engine speed, or the input shaft speed, changes. The drive pullet is substantially encases by a cover, described below, and the crankcase.

Figure 5:
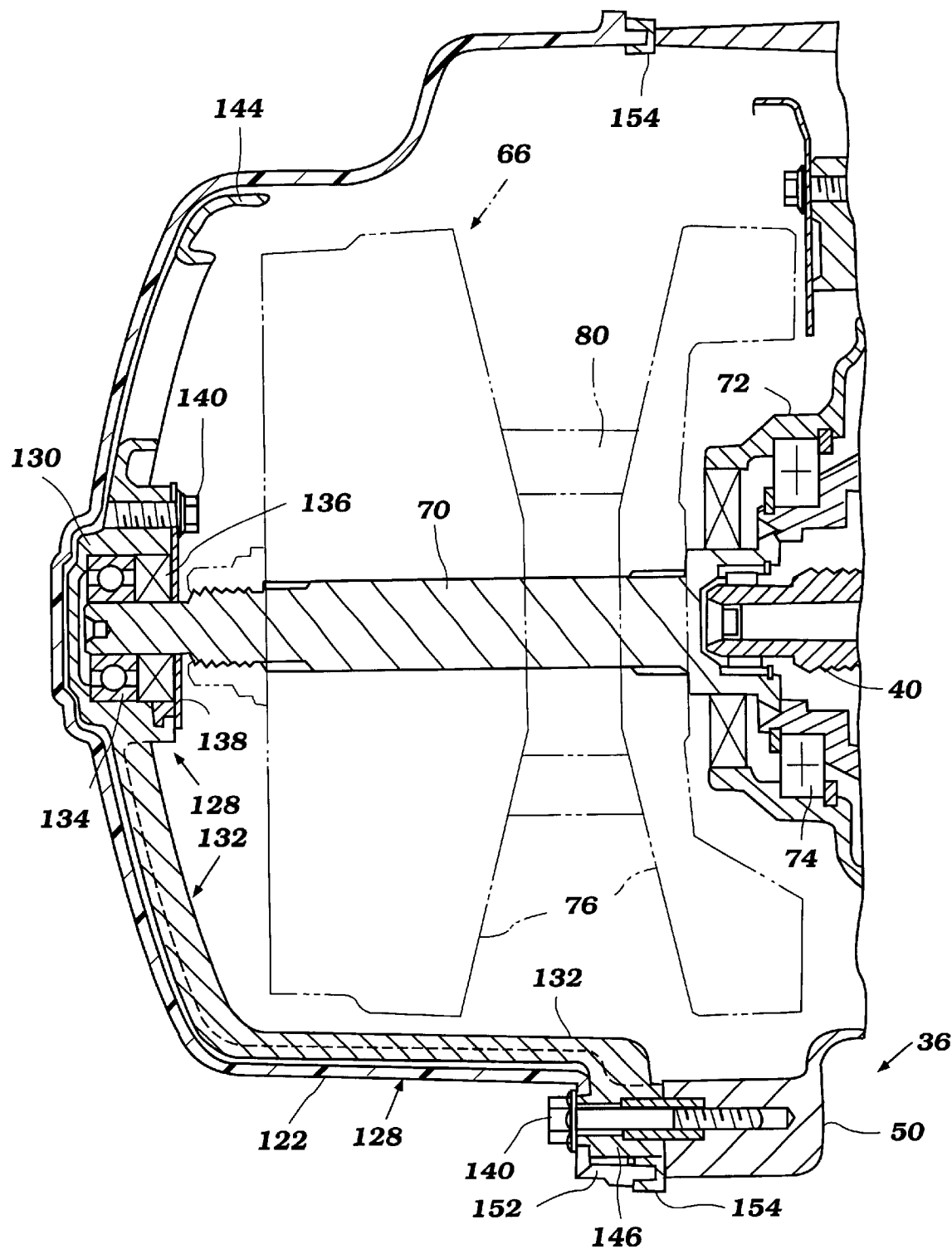
FIG. 5 is a partially sectioned front view of the crankcase and crankcase cover and shaft supporting arrangement of the all terrain vehicle of FIG. 1 with a drive pulley and a drive belt illustrated with phantom lines.

A driven pulley 78 is coupled to the drive pulley 76 with a drive belt 80. A driven pulley may also be configured to change an effective diameter. For instance, in the illustrated arrangement, sheaves forming the driven pulley 78 are forced together by a biasing member, such as, for example, a spring 82. In this manner, the driven pulley 78 can alter an effective diameter to correspond to the changes in the drive pulley's effective diameter. With reference to FIG. 5, the drive pulley and the belt are arranged within the cover to the side of a plane extending through the side surface of the crankcase member 50.

Figure 2:
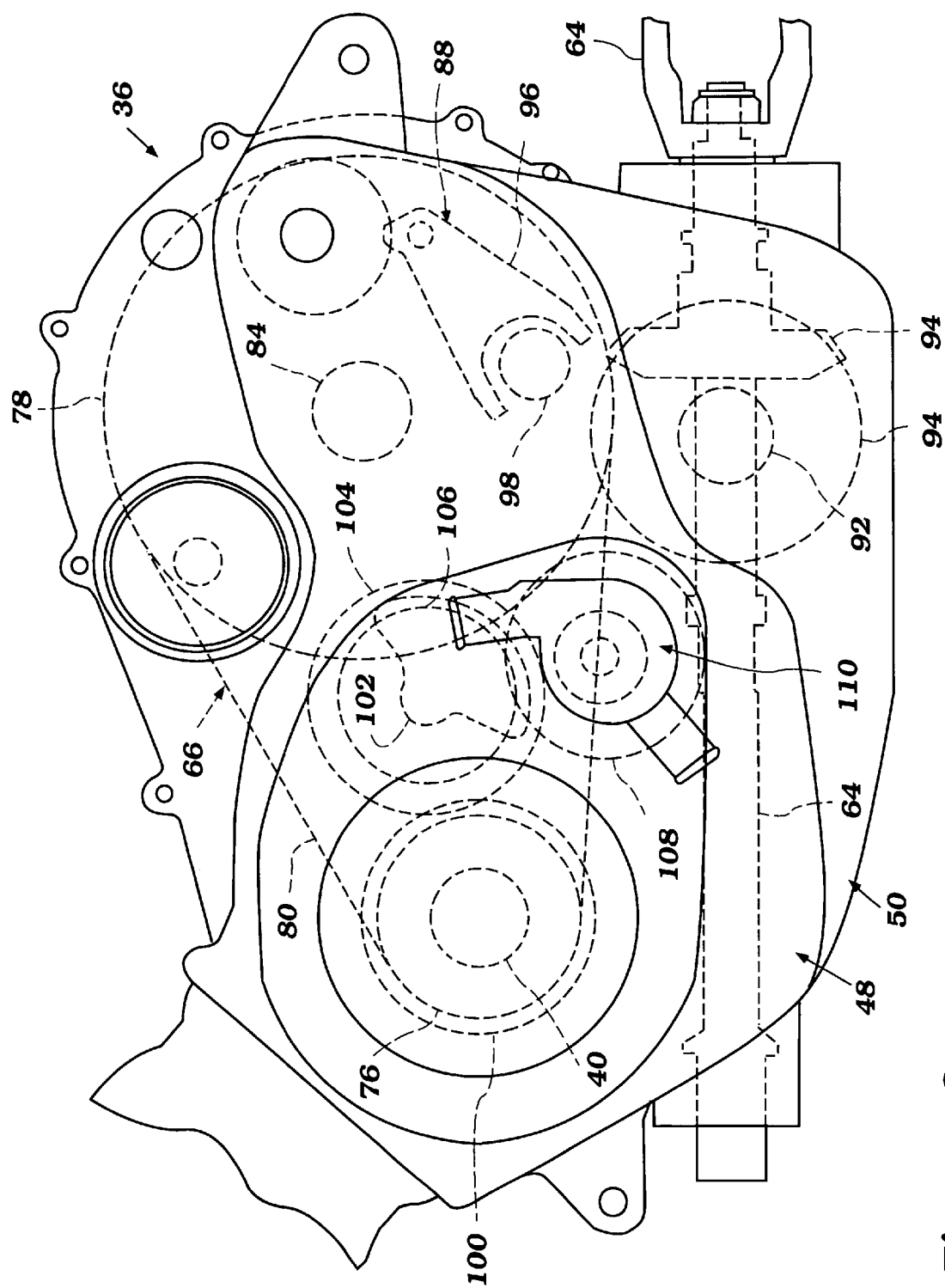
FIG. 2 is an enlarged side view of a portion of a crankcase of the all terrain vehicle of FIG. 1 having some internal components illustrated with hidden lines.

With reference now to FIG. 2, the driven pulley 78 is connected to an output shaft 84. The output shaft 84 extends into the crank chamber 52 through the wall 56. A set of bearings 86 that are positioned within the opening of the wall and backed by a seal, journal the output shaft 84 for rotational motion within the crankcase 36. Thus, the illustrated output shaft 84 is cantilevered from within the crank chamber 52 into the auxiliary chamber 58 where it is connected to the drive pulley 78.

The illustrated output shaft 84 is preferably engaged with a shiftable transmission 88, mainly contained within the crank chamber 52, such that at least a high speed range and a low speed range can be selectively engaged. The shiftable transmission is operated using a lever 89 positioned proximate the operator of the vehicle. The lever, in turn, is connected to a shifting mechanism 91 described below.

In the illustrated arrangement, the shiftable transmission 88 includes a high gear position, a low gear position, a parking position, a neutral position and a reverse position. Specifically, a set of gearing arrangements 90 are selectively coupled to a shiftable transmission output shaft 92 to alter the gear ratio between the two shafts. The selectable transmission output shaft 92 in turn is coupled through a pair of bevel gears 94 to the driveline 63 in a known manner. With reference to FIG. 2, the shifting mechanism 91 includes a shifting fork arrangement 96 that controls the selective engagement of the gears carried by the output shaft 84 with the gears on the main shaft 98 in any suitable manner.

With reference again to FIGS. 2 and 3, the crankshaft 40 also carries a secondary output gear 100 that drives a balancer shaft 102 through a secondary input gear 104. As will be recognized, the secondary input gear 104 and the secondary output gear 100 are preferably arranged with a 1:1 ratio such that for each rotation of the crankshaft, the balancer shaft experiences a rotation. In this manner, the balancer shaft may offset the engine vibrations caused by the crankshaft in piston connection.

With reference to FIG. 3, the balancer shaft 102 also carries an output gear 106. The output gear 106 is drivingly engaged with an auxiliary input gear 108. As will be appreciated by those of ordinary skill in the art, the auxiliary input gear 108 may supply a driving force to a water pump, a lubricant pump, a generator or power takeoff unit. In the illustrated arrangement, the input gear 108 powers a water pump 110.

Figure 4:
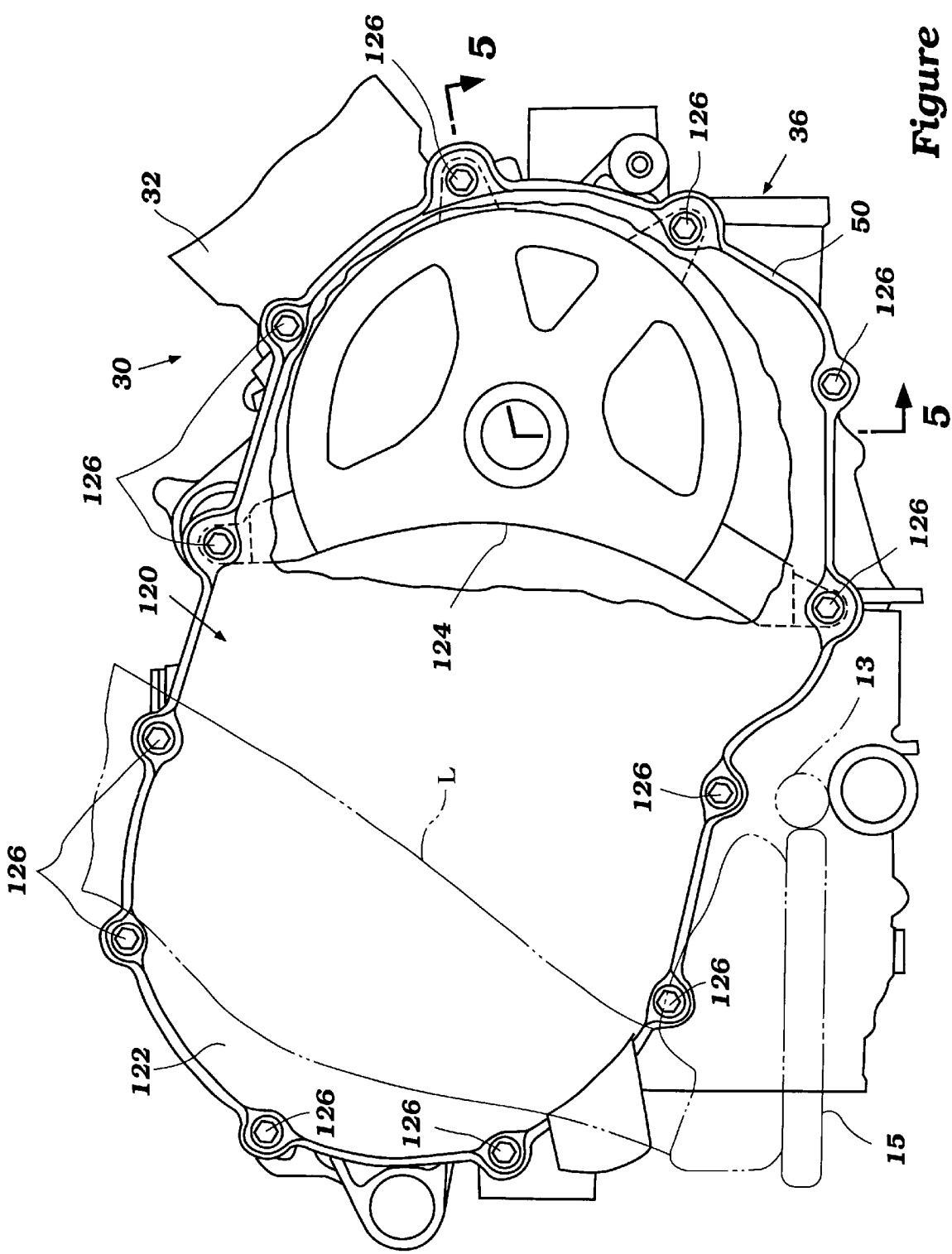
FIG. 4 is a partially sectioned side view of a portion of the crankcase and the transfer case of FIG. 2 illustrating a crankcase cover and shaft supporting arrangement having features, aspects and advantages in accordance with the present invention.

With reference now to FIGS. 4–7, two arrangements of a crankcase cover and bearing mounting arrangement 120 will be described in detail. With reference now to FIG. 4, the assembly 120 is generally comprised of a crankcase cover member 122 and a supporting bracket 124. As illustrated in FIG. 3, the crankcase cover 122 extends laterally from the crankcase and features two portions having different widths in the illustrated arrangement. The widths accommodate the moving components of the transmission and space the cover member 122 from the transmission an appropriate distance. In the illustration in FIG. 4, it is shown that a leg L of an operator having a foot positioned on the foot board 15 or the foot peg 13 will preferably extend downward near the portion of the illustrated cover 122 that has a smaller width and substantially behind the larger width portion of the cover 122 in which the drive pulley 76 is contained for rotation. In this manner, the cover 122 helps accommodate the operator for comfortable seating and leg positioning.

With continued reference to FIG. 4, the crankcase cover 122 and the support bracket 124 are attached by threaded fasteners 126 to the crankcase 36 or in any other suitable manner. Specifically, in the illustrated arrangement, the cover 122 and the bracket 124 are attached to the second portion of the crankcase 50. Moreover, while twelve threaded fasteners 126 are illustrated, any number of threaded fasteners may be used such that the cover 122 and the bracket 124 are adequately supported and held to the crankcase 36.

With reference now to FIG. 5, the mounting arrangement will be described in more detail. Specifically, the crankshaft 40 is connected to the input shaft 70 of the variable speed transmission 66. The input shaft 70 is splined to the drive pulley 76, which carries the drivebelt 80. While the first end of the input shaft 70 is connected to the crankshaft 40 and carried by the bearings 74 contained within the wall 72, a second end of the input shaft 70 is carried by a second bearing arrangement 128. Specifically, the bearing arrangement 128 comprises a bearing carrier 130 that is connected to the crankcase 36 through spider arms 132. The carrier and arms will be described in detail below.

The carrier 130 has a central bore in which a ball bearing arrangement 134 is positioned to journal the input shaft 70 for rotation. A seal 136 is preferably positioned adjacent to the bearing 134 and interposed between the bearing 134 and lockdown plate 138. The plate 138 also includes a central aperture through which the input shaft 70 extends into the bearing 134 through the seal 136. The plate 138 secures the position of the seal 136 and the bearing 134 and is held in place via threaded fastener 140 in the illustrated arrangement. The plate may also be attached in any other suitable manner such as, for instance, but not limited to, a tongue and groove arrangement, an interlocking twist lock arrangement, or a snap fit arrangement. Additionally, press fitting may be used to hold the plate in position. In this manner, the input shaft 70 is journaled for rotation via the first bearings 74 and the second bearings 134.

With reference now to FIGS. 6A–6E, the bearing carrier and spider arrangement 128 will be described in detail. As illustrated, the bearing carrier 130 is preferably centrally disposed within the illustrated arrangement 128. However, it is anticipated that the carrier 130 may also be positioned off center in other arrangements. From the central hub of the carrier 130, the arrangement 128 includes a plurality of arms 132 that radiate outward from the hub 130. It is also anticipated that a single arm or more than four arms may be used to support the hub 130.

Figures 6A, 6B:
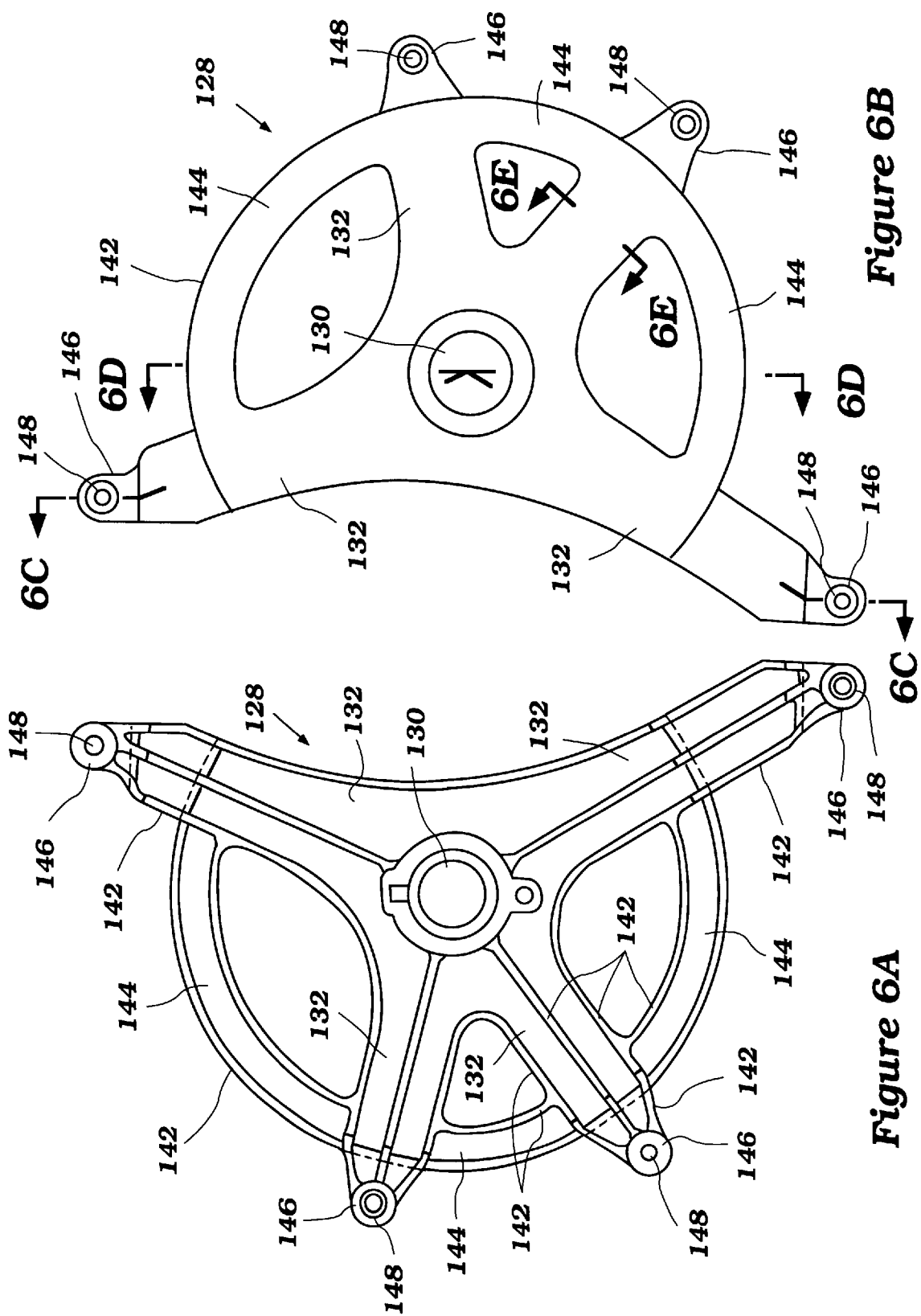
FIG. 6A is a bottom side view of the crankcase cover and shaft supporting arrangement of the all terrain vehicle of FIG. 1.
FIG. 6B is a top view of the crankcase cover and shaft supporting arrangement of FIG. 6A.

As illustrated in FIG. 6A, each of the arms 132 includes a plurality of ribs 142 which reinforce the arms 132 to add strength yet decrease the material and weight associated with each arm 132. While the illustrated arrangement features three ribs per leg, more or less ribs may be used as desired or necessary. Moreover, the illustrated bearing arrangement 128 also features four arms 132. However, more or less arms may be used as required or desired.

Figure 6C:
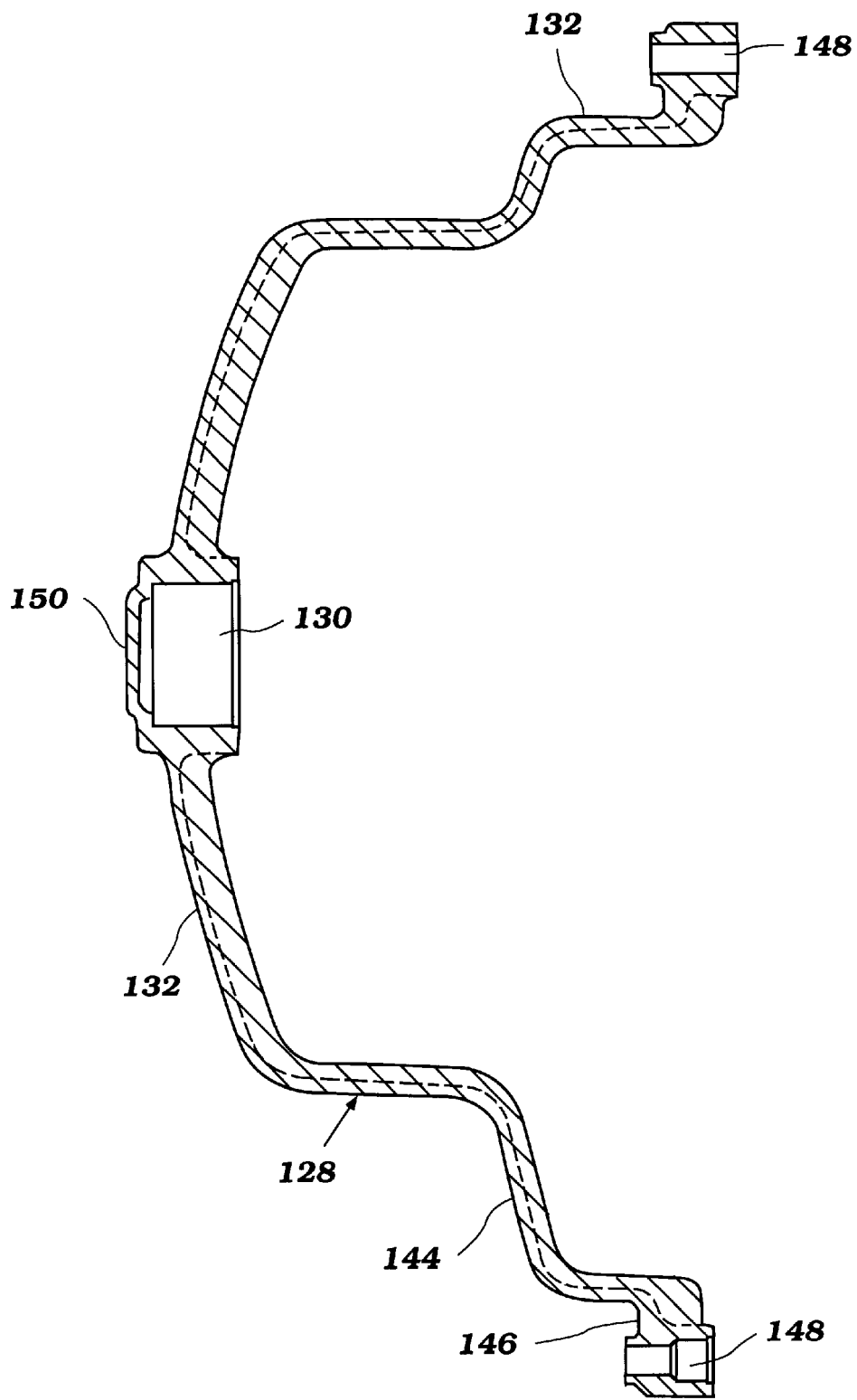
FIG. 6C is a cross-section through the crankcase cover and shaft supporting arrangement of FIG. 6A taken through the line 6C—6C in FIG. 6B.

With reference now to FIG. 6C, the arms 132 preferably radiate outward from the bearing carrier 130 and recede towards the crankcase side of the arrangement 128 only slightly such that the driven pulley 76 may be contained within the carrier arrangement 128. Accordingly, a first curvilinear plane may be defined by the first portion of the arms.

Figure 6D:
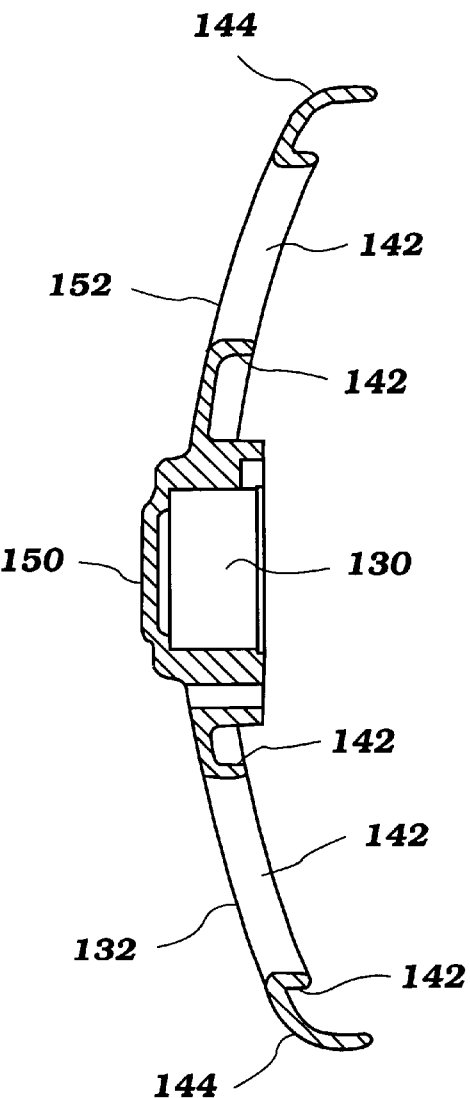
FIG. 6D is a cross-section through the crankcase cover and shaft supporting arrangement of FIG. 6A taken through the line 6D in FIG. 6B.

The arms 132 then sharply turn to extend along a direction substantially parallel to an axis of the input shaft 70 for a short duration such that a second portion of the arms is formed. The arms 132 are then connected to a gusset arrangement 144 that connects the arms 132 together by forming an interconnecting ring structure. In the illustrated arrangement, the gusset ring 144 does not extend a full circle. However, in other arrangements it may. The gusset 144 preferably forms a second curvilinear plane that is generally parallel to the first curvilinear plane defined by the arms 132 as they radiate outward from the bearing carrier 130. With reference to FIG. 6D, the smooth transition defined by the curvilinear plane of the legs 132 as they radiate outward from the carrier 130 and the curvilinear plane of the gussets 144 as they connect the legs 132 create a smooth profile over which a cover 122 may be attached. The gussets 144 strengthen the spider due to their interlocking structure.

Moreover, the illustrated gussets 144 also comprise ribs 142 that may be integrally formed with the ribs 142 of the arms 132. As illustrated in FIG. 6A, the ribs 142 of the arms 132 converge and meet at a plurality of mounting bosses 146. The ribs 142 increase the strength through characteristics similar to that of a channel member.

Figure 6E:
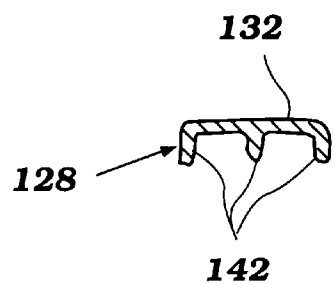
FIG. 6E is a cross-section through the crankcase cover and shaft supporting arrangement of FIG. 6A taken through the line 6E in FIG. 6B; and, FIG. 7 is a sectioned front view of another crankcase cover and shaft supporting arrangement having features, aspects and advantages in accordance with the present invention.

With reference to FIG. 6E, a cross-section of one of the arms is illustrated showing the plurality of ribs 142 and their relationship to an upper surface of the arm 132 for the illustrated carrier 128. It is anticipated that a variety of cross-sections may also be used as will be recognized by those of skill in the art to increase the torsional strength of the arms 132 and the gusset 134. For instance, a crossing pattern rib 142 may be utilized as well as any number of ribs 142 extending in a parallel fashion such as those illustrated.

The plurality of mounting bosses are arranged such that each arm 132 is attached to a corresponding mounting boss 146. The mounting bosses 146 can comprise a mounting portion of the bearing carrier and spider arrangement 128 while the carrier 130 can comprise a shaft supporting portion. In the illustrated arrangement, these two portions are offset from each other. The illustrated bosses 146 extend in a direction substantially normal to the arms 132. However, other arrangements may also be suitable. Additionally, the illustrated mounting bosses 146 are cylindrical having an aperture extending therethrough. The apertures are capable of receiving the threaded fasteners 140 that are used to secure the arrangement 128 to the crankcase 36. It is also anticipated that a separate set of threaded fasteners may be used to attach the bracket to the engine and to attach the cover to the engine.

With reference to FIG. 6D, the carrier 130 is enclosed at one end by a capping member 150. The capping member 150 may be integrally formed with the carrying arrangement 128 or may be a separate member which is attached to enclose the bearing carrier 130 and protect the bearing 134 and seal 136 which are contained therein when assembled.

With reference again to FIG. 5, the cover member 122 preferably extends over and encases the bearing carrier arrangement 128. In the illustrated arrangement, the cover 122 is attached to the bearing carrier arrangement 128 solely at the mounting bosses 146 using a threaded fastener 140. However, it is anticipated that the cover member 122 could be attached to the bearing carrier arrangement 128 in any other location such that the variable speed transmission drive is suitably protected from the elements in any given application. The cover member 122 may also be attached to the crankcase 36 through the use of an outer rim portion 152 that extends around periphery of the cover member 122 proximate the apertures through which the fasteners 140 extend. Additionally, this outer rim portion 152 is received by a seal 154 that is attached to the second portion 50 of the illustrated crankcase 36 to seal the variable speed transmission unit 66 from the elements such as water, dirt and the like. Moreover, the drive belt is contained within the cover portion for ease of maintenance and ease of access.

Figure 7:
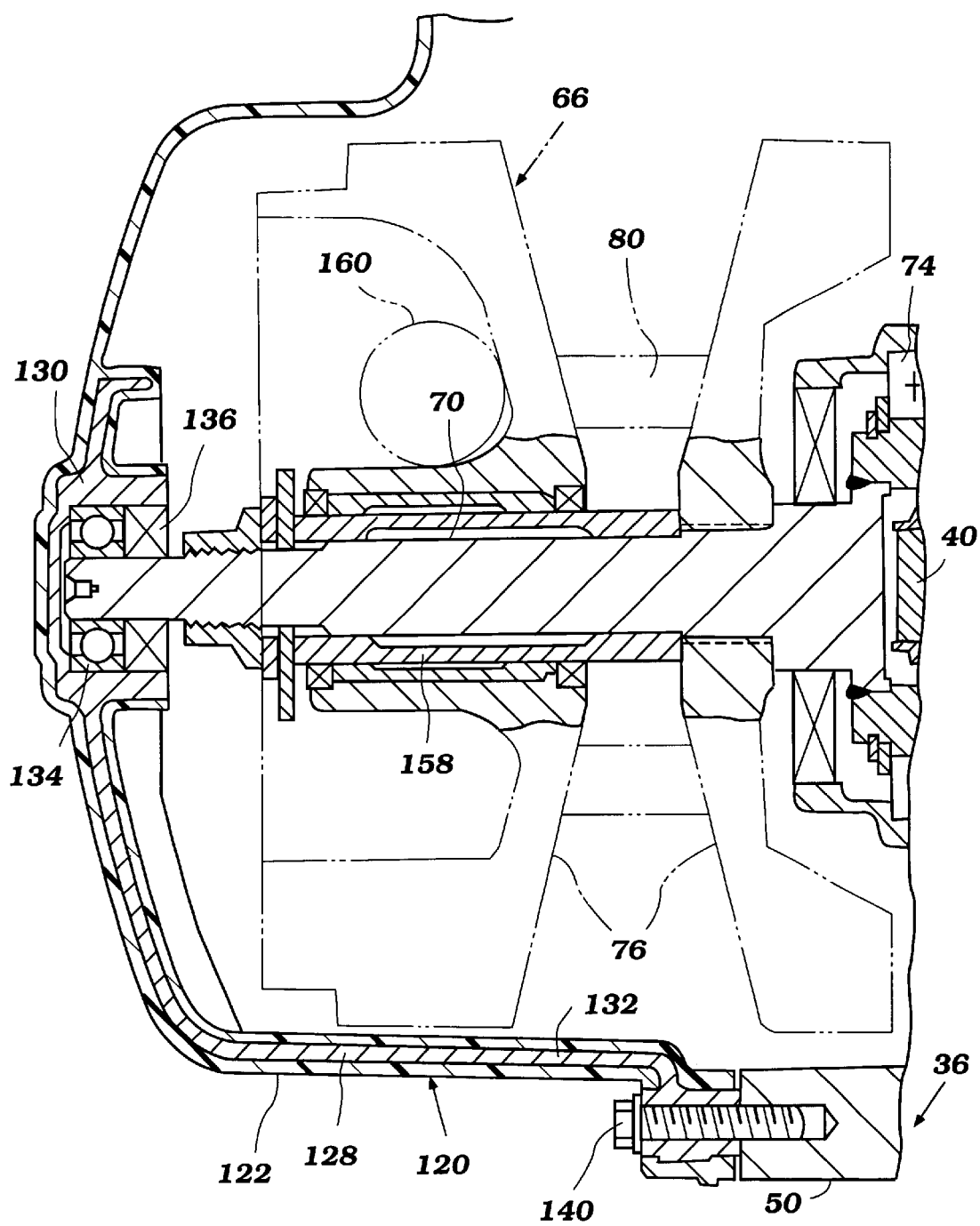

With reference now to FIG. 7, another arrangement of the bearing carrier and crankcase cover supporting arrangement having features aspects and advantages in accordance with the present invention will be described. Because this additional arrangement is very similar to the arrangement described above, like elements will be given like reference numerals. In this arrangement, the sleeve 158 of the driven pulley 76 rides along a spline of the driveshaft 70 in a known manner. As the speed of the driveshaft 70 increases, the weight 160 is forced outward in a radial direction away from the shaft 70 such that the weight pushes the shieves of the drive pulley 76 together thereby increasing the effective diameter experienced by the drivebelt 80.

In the arrangement of FIG. 7, the bearing carrier 130 is not secured by a cover plate, instead the seal 136 and the bearings 134 are positioned within the carrier 130 and are not sealed from the transmission 66 side. It is anticipated, however, that a cover plate could be used to secure the bearings and seal. However, in this arrangement more of the material forming the carrier 130 remains and the reinforcing elements may be reduced accordingly as illustrated.

With reference to FIG. 7, the illustrated bearing carrier arrangement 128 has a reduced thickness while the actual cover member 122 has an increased thickness as compared to that of FIG. 5. Moreover, the cover member 122 has channels sized and configured to receive the bearing carrier arrangement 128 such that the cover 122 acts as a reinforcing member for the bearing carrier arrangement 128. Specifically, the cover 122 and the bearing carrier spider work together to result in a composite structure with increased support for the shaft and lighter overall weight.

In both of the arrangements described above, the cover is advantageously made from a material that does not conduct heat as well as an aluminum alloy or other metallic material. For instance, the illustrated cover made be made from a resin based material, such as a thermal plastic or the like. These materials are of reduced density as compared to most metals and, accordingly, result in a lower weight cover assembly. Moreover, due to the reduced thermal conductivity of the preferred materials, the likelihood of heat transferred through the cover is reduced. Thus, the leg of an operator is better shielded from the heat that builds up within the transmission. Moreover, the spider arrangement of the bearing carrier 128 allows for a reduction in the material while not significantly deteriorating the strength of the bearing carrier. As will be recognized, a polymerized cover member 122 may be molded or formed in other suitable manners with significantly less effort than forging or otherwise forming an aluminum alloy or metallic cover member.

Although the present invention has been described in terms of certain preferred embodiments, other embodiments apparent to those of ordinary skill in the art also are within the scope of this invention. Thus, various changes and modifications may be made without departing from the spirit and scope of the present invention. For instance, the cover arrangement described above may also be employed to cover a chain drive. Moreover, not all of the features, aspects and advantages are necessarily required to practice the present invention. Accordingly, the scope of the present invention is intended to be defined only by the claims that follow.

What is claimed is:

1. An all terrain vehicle comprising a frame, an engine compartment defined within the frame, an engine mounted within the engine compartment, the engine comprising a crankcase, a transversely-extending crankshaft, a transmission connected to the crankshaft, the transmission comprising a drive pulley, a driven pulley and a flexible loop connecting the drive pulley to the driven pulley, a transmission input shaft connected to the drive pulley, a first bearing supporting a first end of the input shaft and positioned proximate the crankcase, a second bearing supporting a second end of the input shaft, a bearing bracket carrying the second bearing, a bearing retaining portion formed on the bearing bracket, the bearing positioned within the bearing retaining portion, and the bearing bracket having at least one arm extending between the crankcase and the bearing retaining portion.

2. The all terrain vehicle of claim 1, wherein the transmission is a variable speed V-belt transmission.

3. The all terrain vehicle of claim 1, wherein the transmission is a chain drive.

4. The all terrain vehicle of claim 1 further comprising a plane defined by a juncture between the bearing bracket and the crankcase, wherein the flexible loop is positioned on one side of the plane and the crankcase is positioned on the other side of the plane.

5. The all terrain vehicle of claim 1 further comprising a cover member attached to the crankcase and covering the bearing bracket and at least a portion of the transmission.

6. The all terrain vehicle of claim 5, wherein the transmission is encased within a chamber defined, at least in part, by the cover member and the crankcase.

7. The all terrain vehicle of claim 1, wherein the bearing bracket comprises four arms extending radially from the bearing retaining portion.

8. The all terrain vehicle of claim 7, wherein at least two adjoining arms are connected by a gusset.

9. The all terrain vehicle of claim 8, wherein the arms further comprise a ribbed reinforcing portion.

10. The all terrain vehicle of claim 8 further comprising a cover member attached to the crankcase and covering the bearing bracket, wherein the cover member supports the bearing bracket through internal ribs.

11. An all terrain vehicle comprising a frame, an engine compartment defined within the frame, an engine mounted within the engine compartment, the engine comprising a crankcase defining, at least in part, a crankchamber, a transversely-extending crankshaft disposed at least partially within said crankchamber, a transmission comprising a drive pulley, a driven pulley and a flexible loop connecting the drive pulley to the driven pulley, a transmission output shaft connected to the driven pulley, the drive pulley connected to the crankshaft, a first bearing supporting said drive pulley and positioned proximate the crankcase, a second bearing supporting said drive pulley, a transmission cover comprising a first member and a second member, the first member comprising a bearing retaining portion defining a first plane and a mounting portion defining a second plane, the first plane spaced from the second plane by a substantially transversely extending intermediate portion integrally connecting the bearing retaining portion to the mounting portion, the bearing retaining portion carrying the second bearing, the second member sized and configured to encase the first member.

12. The all terrain vehicle of claim 11, wherein the first member is intersected by a first axis defined by the crankshaft and the second member is intersected by the first axis and a second axis defined by the transmission output shaft.

13. The all terrain vehicle of claim 11, wherein the first member is metal and the second member is plastic.

14. The all terrain vehicle of claim 11, wherein a single set of threaded fasteners connect the first member and the second member to the engine.

15. The all terrain vehicle of claim 11, wherein said intermediate portion comprises a number of distinct arms that connect said bearing retaining portion and said mounting portion.

16. The all terrain vehicle of claim 11, wherein at least one through-hole that extends through said first plane is defined within the first member.

17. The all terrain vehicle of claim 14, wherein the second member extends over said at least one through-hole.

18. An all terrain vehicle comprising a frame assembly supported by at least one wheel, said frame assembly defining an engine compartment, an engine disposed within said engine compartment, said engine driving said wheel through a transmission, a transmission cover at least partially defining a transmission chamber, said transmission at least partially disposed within said transmission chamber, said transmission comprising a first shaft and a second shaft, said first shaft and second shaft being connected, said first shaft inputting power into said transmission and said second shaft outputting power from said transmission, said transmission cover comprising a first member and a second member, said first member extending over said first shaft and said second member extending over said first shaft and said second shaft, and said first member rotatably supporting at least one end of said first shaft.

19. The all terrain vehicle of claim 18, wherein said second member of said transmission cover is made of a resin-based material.

20. The all terrain vehicle of claim 18, wherein said first member of said transmission cover is made of a metal-based material and said second member of said transmission cover is made of a resin-based material.

21. The all terrain vehicle of claim 18, wherein said first shaft carries a drive pulley and said second shaft carries a driven pulley, said drive pulley and said driven pulley being connected by a flexible transmitter, said first member of said transmission cover extending over said drive pulley and said second member of said transmission cover extending over said drive pulley and said driven pulley.

22. The all terrain vehicle of claim 21, wherein said first member of said transmission cover does not extend over said driven pulley.

23. The all terrain vehicle of claim 18, wherein said first member of said transmission cover comprises a mounting portion and a shaft supporting portion, said mounting portion and said shaft supporting portion being offset from each other.

24. The all terrain vehicle of claim 23, wherein said mounting portion and said shaft supporting portion are connected by at least one arm.

25. The all terrain vehicle of claim 24, wherein said mounting portion and said shaft supporting portion are connected by four arms.

26. The all terrain vehicle of claim 25, wherein said mounting portion comprises four segments that correspond to said four arms.

* * * * *